US011754722B2

(12) United States Patent
Miyamoto et al.

(10) Patent No.: US 11,754,722 B2
(45) Date of Patent: Sep. 12, 2023

(54) INFORMATION PROCESSING APPARATUS, INFORMATION PROCESSING SYSTEM, INFORMATION PROCESSING METHOD, AND NON-TRANSITORY COMPUTER READABLE MEDIUM

(71) Applicant: NEC Solution Innovators, Ltd., Tokyo (JP)

(72) Inventors: Ryo Miyamoto, Tokyo (JP); Maho Kashiwagi, Tokyo (JP); Yuka Kanda, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 243 days.

(21) Appl. No.: 17/277,881

(22) PCT Filed: Jun. 14, 2019

(86) PCT No.: PCT/JP2019/023659
§ 371 (c)(1),
(2) Date: Mar. 19, 2021

(87) PCT Pub. No.: WO2020/066155
PCT Pub. Date: Apr. 2, 2020

(65) Prior Publication Data
US 2021/0349220 A1 Nov. 11, 2021

(30) Foreign Application Priority Data
Sep. 26, 2018 (JP) ................................. 2018-180824

(51) Int. Cl.
*G01S 19/08* (2010.01)
*G01S 19/37* (2010.01)

(52) U.S. Cl.
CPC .............. *G01S 19/08* (2013.01); *G01S 19/37* (2013.01)

(58) Field of Classification Search
CPC ................................ G01S 19/08; G01S 19/37
(Continued)

(56) References Cited

U.S. PATENT DOCUMENTS 9,354,320 B2 * 5/2016 Sasahara ................. G01S 19/21

FOREIGN PATENT DOCUMENTS

JP 2009-229295 A 10/2009
JP 2010-019728 A 1/2010
(Continued)

OTHER PUBLICATIONS

International Search Report for PCT Application No. PCT/JP2019/023659, dated Aug. 6, 2019.
(Continued)

*Primary Examiner* — Harry K Liu
(74) *Attorney, Agent, or Firm* — Sughrue Mion, PLLC (57) ABSTRACT

An information processing apparatus includes a positioning signal acquisition unit configured to acquire a positioning signal transmitted from a positioning satellite and a parameter acquisition unit configured to acquire a parameter preset based on the positioning signal. The information processing apparatus further includes a storage unit configured to store a plurality of the parameters at a plurality of time points in a preset period, an accuracy index calculation unit configured to or calculating a positioning accuracy index from the plurality of stored parameters, and an output unit configured to output the positioning accuracy index.

7 Claims, 6 Drawing Sheets

(58) Field of Classification Search
USPC .................................................. 342/357.45
See application file for complete search history.

(56) References Cited

FOREIGN PATENT DOCUMENTS

| JP | 2012-058185 A | 3/2012 |
| JP | 2018-004434 A | 1/2018 |

OTHER PUBLICATIONS

Japanese Office Action for JP Application No. 2020-547974 dated Mar. 29, 2022 with English Translation.

* cited by examiner

|  | PARAMETER FLUCTUATION INDEX | | | |
|---|---|---|---|---|
|  | A | B | C | TOTAL |
| GNSS SATELLITE 1 | 2 | 3 | 1 | 6 |
| GNSS SATELLITE 2 | 7 | 3 | 8 | 18 |
| GNSS SATELLITE 3 | 1 | 1 | 2 | 4 |

INFORMATION PROCESSING APPARATUS, INFORMATION PROCESSING SYSTEM, INFORMATION PROCESSING METHOD, AND NON-TRANSITORY COMPUTER READABLE MEDIUM

This application is a National Stage Entry of PCT/JP2019/023659 filed on Jun. 14, 2019, which claims priority from Japanese Patent Application 2018-180824 filed on Sep. 26, 2018, the contents of all of which are incorporated herein by reference, in their entirety.

TECHNICAL FIELD

The present disclosure relates to an information processing apparatus, an information processing system, an information processing method, and a program.

BACKGROUND ART

In a mobile body such as an automobile, a navigation system using GNSS (Global Navigation Satellite System) is widely used. In navigation systems, it is important to perform positioning accurately in any kind of environments. However, when a method for positioning the location of a mobile object by a GNSS satellite is used, the location accuracy may degrade due to various factors.

The factors that degrade the location accuracy include, for example, an orbit error of the satellite, a clock error, a fluctuation of the ionosphere, a fluctuation of the troposphere, a signal interception caused by blocking of radio waves by clouds, forests, buildings, etc., and multipath reception caused by reflection of radio waves in forests, high-rise buildings, etc. When accurate location information cannot be acquired, the reliability of the positioning result is lowered.

In order to address this issue, a technique has been proposed for selecting a positioning result with a high degree of reliability based on the degree of reliability of a positioning result using a GNSS function and the degree of reliability of a positioning result using an autonomous navigation positioning (see, for example, Patent Literature 1).

CITATION LIST

Patent Literature

Patent Literature 1: Japanese Unexamined Patent Application Publication No. 2009-229295

SUMMARY OF INVENTION

Technical Problem

The technique disclosed in Patent Literature 1 calculates the degree of reliability of a satellite positioning result based on HDOP (Horizontal Dilution of Precision) information and SN (Signal to Noise Ratio) information. Thus, the calculation is based on the environment to be positioned, and determination based on the actual movement of the object cannot be performed. In other words, the technique described in Patent Literature 1 may lower the reliability of the result of satellite positioning.

An object of the present disclosure is to provide an information processing apparatus, an information processing method, and a program which solve the problem that the reliability of the result of satellite positioning is lowered.

Solution to Problem

An example aspect is an information processing apparatus including a positioning signal acquisition unit configured to acquire a positioning signal transmitted from a positioning satellite and a parameter acquisition unit configured to acquire a parameter preset based on the positioning signal. The information processing apparatus further includes a storage unit configured to store a plurality of the parameters at a plurality of time points in a preset period, an accuracy index calculation unit configured to calculate a positioning accuracy index from the plurality of stored parameters, and an output unit configured to output the positioning accuracy index.

Another example aspect is an information processing method including: acquiring a positioning signal transmitted from a positioning satellite; acquiring a parameter preset based on the positioning signal; storing a plurality of the parameters at a plurality of time points in a preset period; calculating a positioning accuracy index from the plurality of stored parameters; and outputting the positioning accuracy index.

Another example aspect is a program causing a computer to execute the following method. The method includes: acquiring a positioning signal transmitted from a positioning satellite and acquiring a parameter preset based on the positioning signal. The method further includes storing a plurality of the parameters at a plurality of time points in a preset period, calculating a positioning accuracy index from the plurality of stored parameters and outputting the positioning accuracy index.

Advantageous Effects of Invention

According to the present disclosure, it is possible to provide an information processing apparatus or the like for determining the reliability of a positioning result using a positioning signal received from a GNSS satellite.

DESCRIPTION OF EMBODIMENTS

For clarity of explanation, the following description and drawings have been omitted and simplified as appropriate.

First Example Embodiment

Figure 1:
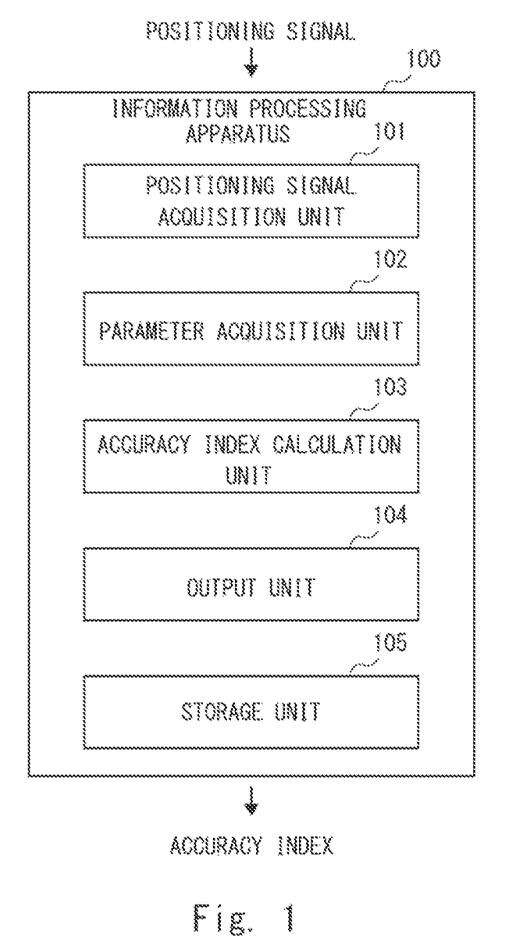
FIG. 1 is a schematic block diagram of an information processing apparatus according to a first example embodiment.

Example embodiments of the present disclosure will be described below with reference to the drawings. FIG. 1 is a schematic configuration diagram of an information processing apparatus according to a first example embodiment. In this example embodiment, the information processing apparatus 100 is incorporated into, for example, a car navigation system. The information processing apparatus 100 acquires a positioning signal transmitted from a GNSS satellite, determines the reliability of a positioning result calculated from the acquired positioning signal, and provides the determination result to the car navigation system. The determination result output by the information processing apparatus 100 is referred to as an accuracy index (or positioning accuracy index). The information processing apparatus 100 includes a positioning signal acquisition unit 101, a parameter acquisition unit 102, an accuracy index calculation unit 103, an output unit 104, and a storage unit 105 as main components. The details of each component will be described below along a flow of a signal.

The positioning signal acquisition unit 101 acquires the positioning signal supplied from the outside. The positioning signal acquisition unit 101 is, for example, an interface for receiving a positioning signal in accordance with a preset communication protocol. The positioning signal acquisition unit 101 may also be a bus interface that appropriately accepts the positioning signal in response to a request from the outside.

The positioning signal is included in a radio wave transmitted by the GNSS satellite. When the car navigation system receives the radio wave transmitted from the GNSS satellite, the car navigation system amplifies and demodulates the received radio wave. The positioning signal acquisition unit 101 receives the positioning signal demodulated by the car navigation system and supplies the received positioning signal to the parameter acquisition unit 102.

The parameter acquisition unit 102 receives the positioning signal from the positioning signal acquisition unit 101 and acquires a preset parameter from the received positioning signal. The parameter acquired by the parameter acquisition unit 102 includes information included in the signal from each satellite included in the positioning signal, or a (estimated) value estimated (calculated) from the information included in the positioning signal.

An example of calculating the estimated value from the information included in the positioning signal will be described below. A GNSS receiver, such as a car navigation system, calculates a value called a pseudo range to position its location. The pseudo range is calculated by multiplying a propagation time of the positioning signal between the satellite and the receiver measured by a positioning code called PRN (Pseudo-Random Noise) included in the positioning signal by the speed of light. When the pseudo range is defined as Pi, a observation model of the pseudo range can be expressed by the following Formula (1).

[Formula 1]

$$P_i = c(t_r - t^S) + \varepsilon_{Pi} = \rho + c(dt - dT) + I_i + T + \varepsilon_{Pi} \quad (1)$$

In Formula 1, c is the speed of light in a vacuum, $t_r$ is a reception time of the postioning signal at the receiver, is $t^S$ a transmission time of the positioning signal at the satellite, $\varepsilon_{Pi}$ is an observation error, p is a geometric distance between the satellite and an observation point, dt is a clock error of the receiver, dT is a clock error of the satellite, $I_i$ is a ionospheric delay, and T is a tropospheric delay. The approximate location can be determined by conducting positioning using the pseudo range calculated by the GNSS receiver. However, the location can be determined with higher accuracy by estimating more detailed parameters as shown in Formula (1).

The GNSS receiver calculates a value called a carrier phase in addition to the above pseudo range. The carrier phase is a continuous measurement of the carrier phase angle of the positioning signal demodulated by the receiver. The GNSS receiver can conduct positioning with higher location accuracy by utilizing the calculated carrier phase. When the carrier phase is defined as Li, the observation model can be expressed by the following Formulas (2) and (3).

[Formula 2]

$$L_i = \lambda_i \Phi_i = \rho + c(dt - dT) - I_i + T + \lambda_i N_i + \varepsilon_{Li} \quad (2)$$

[Formula 3]

$$N_i = \Phi_{0r,i} - \Phi_{0,i}^S + n_i \quad (3)$$

In Formulas (2) and (3), Li is a carrier phase as a distance, $\lambda i$ is a carrier wavelength, $\Phi i$ is a carrier phase as a dimensionless quantity, Ni is a carrier phase bias, $\varepsilon_{Li}$ is the observation error, $\Phi_{0r,i}$ is an initial phase of the receiver, $\Phi^S_{0,i}$ is an initial phase of the satellite, and n is an integer ambiguity.

By estimating various parameters based on the observation model of the pseudo range and the carrier phase and the positioning signal of the satellite, the location with higher accuracy is obtained. The parameters included in the positioning signal include, for example, a positioning signal transmission clock, signal intensity, navigation message of the satellite, and so on. The parameter acquisition unit 102 estimates the parameters of the error factors expressed by Formulas (1) to (3) in addition to the above parameters acquired from the positioning signal, and supplies them to the accuracy index calculation unit 103.

The accuracy index calculation unit 103 calculates the accuracy index by performing preset accuracy index calculation on the plurality of parameters received from the storage unit 105, which will be described later. The accuracy index is associated with the positioning signal received by the GNSS receiver, and is a value indicating whether or not the positioning can be performed according to the positioning accuracy expected by a user when the location of the GNSS receiver is positioned using the received positioning signal. That is, the user can determine the reliability of the positioning signal by referring to the positioning signal and the accuracy index. The accuracy index calculation unit 103 calculates the accuracy index from the parameters by a preset method, and supplies the calculated accuracy index to the output unit 104.

The output unit 104 outputs the accuracy index received from the accuracy index calculation unit 103 to the outside of the information processing apparatus 100. The output unit 104 is, for example, an interface for outputting the accuracy index to the outside in accordance with the preset communication protocol. The output unit 104 may be a bus interface for appropriately outputting buffered signals in response to a request from an output destination.

When the output unit 104 outputs the accuracy index, the output unit 104 also outputs information about the positioning signal corresponding to the output accuracy index. The information about the positioning signal corresponding to the output accuracy index is, for example, identification information unique to the satellite and the reception time of the positioning signal.

The storage unit 105 is a storage device composed of a volatile memory such as a DRAM (Dynamic Random Access Memory) and an SRAM (Static Random Access Memory) or a non-volatile memory such as a flash memory. The storage unit 105 stores the parameters received from the parameter acquisition unit 102. The storage unit 105 stores the plurality of parameters at a plurality of different time points in a preset period. The storage unit 105 supplies the plurality of stored parameters to the accuracy index calculation unit 103.

Figure 2:
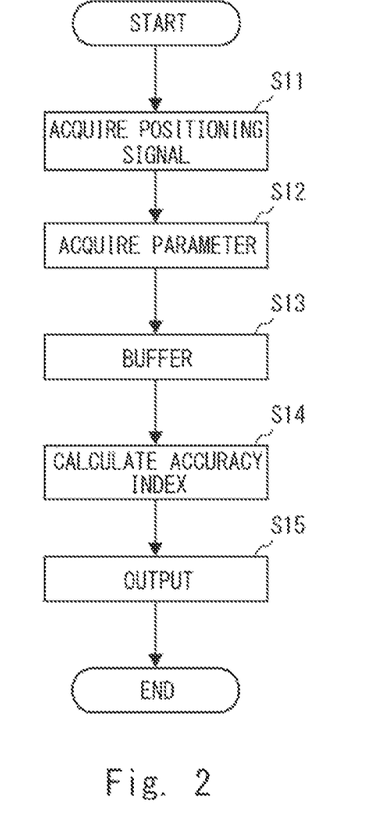
FIG. 2 is a flowchart of processing performed by the information processing apparatus according to the first example embodiment.

Next, an example of processing performed by the information processing apparatus according to the first example embodiment will be described with reference to FIG. 2. FIG. 2 is a flowchart of processing performed by the information processing apparatus according to the first example embodiment.

First, the information processing apparatus 100 acquires the positioning signal through the positioning signal acquisition unit 101 (Step S11). The positioning signal acquisition unit 101 is configured to acquire the positioning signal every preset period. The preset period is, for example, 1 second, 5 seconds, or 10 seconds. The positioning signal acquisition unit 101 acquires the positioning signal every preset period in accordance with the operation of a counter (not shown) included in the information processing apparatus 100.

Next, the parameter acquisition unit 102 extracts the preset parameter from the positioning signal received from the positioning signal acquisition unit 101 (Step S12). Then, the parameter acquisition unit 102 supplies the extracted parameter to the storage unit 105.

Next, the storage unit 105 buffers the parameter received from the parameter acquisition unit 102 (Step S13). Here, the storage unit 105 stores a preset number of the parameters at a plurality of different time points in the storage area. The preset number may be set, for example, 10, 20, 50, or the like. Alternatively, a buffering period may be set, and the parameters for the buffering period such as 1 minute, 2 minutes, or 5 minutes may be stored. The plurality of different time points are time points for each period set by the positioning signal acquisition unit 101 in Step S11. The storage unit 105 continues to store the parameters at a plurality of different time points until a preset number of parameters is accumulated, and when the set number of parameters is accumulated, the parameters are supplied to the accuracy index calculation unit 103 as one parameter group.

Next, the accuracy index calculation unit 103 reads the parameter group from the storage unit 105, and calculates the accuracy index from the read parameter group (Step S14). The accuracy index calculation unit 103 supplies the calculated accuracy index to the output unit 104. Then, the output unit 104 outputs the accuracy index received from the accuracy index calculation unit 103 to the outside (Step S15).

An example of the processing of the information processing apparatus 100 according to this example embodiment has been described so far. Each operation of the flowchart shown in the drawing is not limited to the above-described contents. For example, the positioning signal acquisition unit 101 may receive all the positioning signals from the outside, and the parameter acquisition unit 102 may perform an operation for extracting the parameters for each preset period. Further, the storage unit 105 may supply, for every preset period (the period shall be referred to as, for example, P1) as the parameter group to be stored, all of the data accumulated in the period P1 to the accuracy index calculation unit 103. The storage unit 105 may accumulate the parameters for a period (the period shall be referred to as, for example, P2) longer than the period P1, and supply all of the data stored in the period P2 to the accuracy index calculation unit 103 for every period P1, which is shorter than the period P2. That is, the number of the parameters to be accumulated may be different from the number of parameters to be supplied to the accuracy index calculation unit 103. In this case, the storage unit 105 may delete (or overwrite) the oldest accumulated parameters, number of which is the same as the number of new parameters to be accumulated, to thereby store the new parameters.

Figure 3:
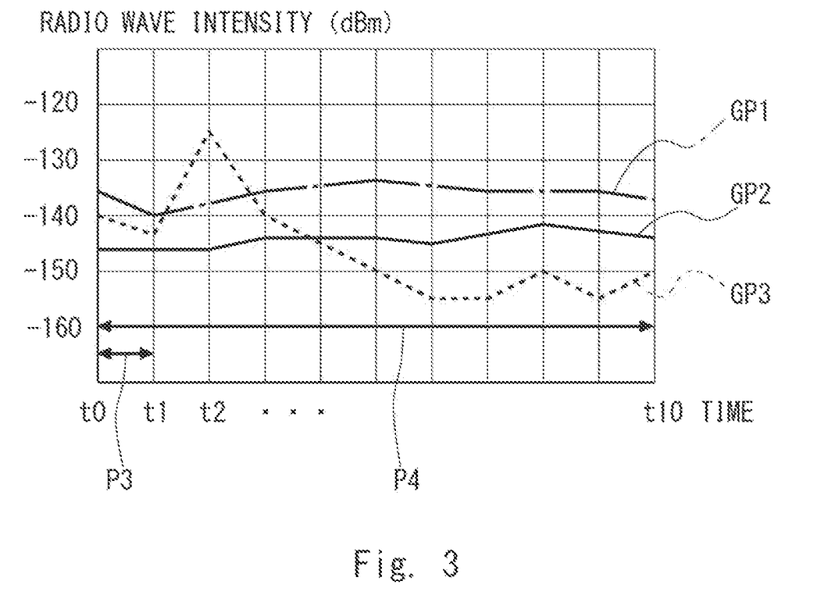
FIG. 3 is a graph showing parameter fluctuations of the information processing system according to the first example embodiment.

Next, an example of the accuracy index calculated by the accuracy index calculation unit 103 using the parameter group will be described with reference to FIG. 3. FIG. 3 is a graph showing parameter fluctuations of the information processing system according to the first example embodiment. FIG. 3 is a graph in which the parameters stored in the storage unit 105 are plotted to facilitate understanding of the parameter group.

The horizontal axis of the graph represents the time. The left end of the graph is at a time t0, and the right end of the graph is at a time t10 when a preset period has elapsed from the time t0. The interval between the time t0 and the time t1 is shown as a sampling period P3, and the interval between the time t0 and the time t10 is shown as a buffering period P4. This indicates that a group of parameters are parameters accumulated in the storage unit 105 for every sampling period P3, and, for example, the group of parameters is composed of eleven parameters for the buffering period P4 from the time t0 to the time t10.

The vertical axis of the graph shows the radio wave intensity of the positioning signals received from the GNSS satellite as an example of the parameters. In this example, the value on the vertical axis of the graph is −160 dBm to −120 dBm from the bottom.

Lines GP1, GP2, and GP3 are plotted in the graph configured as described above. The lines GP1, GP2, and GP3 show the transitions of the radio wave intensities of the respective GNSS satellites. That is, the line GP1 is, for example, the radio wave intensity of the GNSS satellite 1, the line GP2 is, for example, the radio wave intensity of the GNSS satellite 2, and the line GP3 is, for example, the radio wave intensity of the GNSS satellite 3.

According to the graph, as shown by the line GP1, the transition of the radio wave intensity of the GNSS satellite 1 is relatively stable within the range of −140 to −133 dBm. As indicated by the line GP2, the transition of the radio wave intensity of the GNSS satellite 2 is relatively stable within the range of −147 to −141 dBm. On the other hand, as shown by the line of GP3, the radio wave intensity of the GNSS satellite 3 fluctuates relatively largely within the range of −155 to −125 dBm. The storage unit 105 stores parameters indicating such a state.

The accuracy index calculation unit 103 acquires each parameter indicating such a state from the storage unit 105 as the parameter group. Then, accuracy index calculation unit 103 calculates, for example, the degree of fluctuation of the radio wave intensity for each GNSS satellite as a "satellite accuracy index". The satellite accuracy index is an accuracy index calculated for each satellite. In this example, the degree of fluctuation calculated by the accuracy index calculation unit 103 is, for example, a standard deviation. That is, the accuracy index calculation unit 103 calculates the degree of fluctuation, which is the variation of the radio wave intensity of the GNSS satellite in the buffering period P4, as the satellite accuracy index. The information processing apparatus 100 outputs the satellite accuracy index thus calculated by the accuracy index calculation unit 103 to the outside through the output unit 104.

The first example embodiment has been described so far. Although the standard deviation is shown as an example of the degree of fluctuation in the above example, a value other than the standard deviation may be calculated depending on the attribute of the parameter. Examples of the value other than the standard deviation include a total value, an average value, and a weighted average value.

The accuracy index calculation unit 103 may calculate the accuracy index according to a traveling speed of an automobile on which the information processing apparatus 100 is mounted. That is, when the case in which the automobile is traveling at a first speed (e.g., 10 km/h) is compared with the case in which the automobile is traveling at a second speed (e.g., 100 km/h), the degree of fluctuation of the positioning signal at the first speed tends to be a more stable value than the degree of fluctuation of the positioning signal at the second speed. Therefore, in the case of the first speed, for example, the sampling period P3 may be a longer interval than that in the case of the second speed.

In addition, the accuracy index calculation unit 103 may apply a preset weighting to the satellite accuracy index calculated according to the traveling speed of the automobile. That is, in the case of the second speed, the state of the acquired positioning signal tends to be unstable compared with that in the case of the first speed. Thus, the accuracy index calculation unit 103 may apply a weighting, for example, in such a way that the reliability of the satellite accuracy index at the second speed becomes relatively lower than that at the first speed.

The information processing apparatus 100 according to this example embodiment may be mounted on an automobile, a ship, an aircraft, a drone, a motorcycle, or the like, as long as the mobile body has a function of positioning the location of the mobile body using GNSS signals. In addition to the mobile body, the information processing apparatus 100 according to this example embodiment may be mounted on a personal computer, smartphone, a wristwatch, or a helmet which has a function of positioning the location of itself using GNSS signals.

With the above configuration, the information processing apparatus 100 according to the first example embodiment outputs the satellite accuracy index for determining the reliability of the positioning result using the positioning signal received from the GNSS satellite. Therefore, according to the first example embodiment, it is possible to provide an information processing apparatus or the like for determining the reliability of the positioning result using the positioning signal received from the GNSS satellite.

Modified Example of First Example Embodiment

Figure 4:
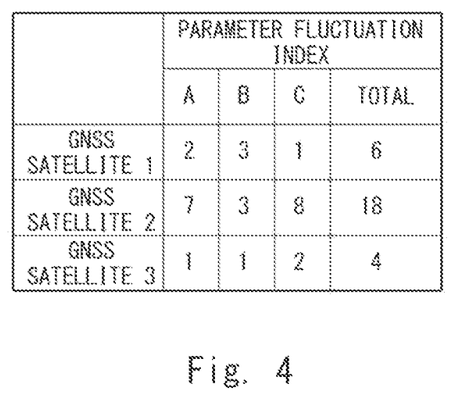
FIG. 4 is a diagram for explaining the degree of fluctuations of parameters of an information processing system according to a modified example of the first example embodiment.

Next, a modified example of the first example embodiment will be described with reference to FIG. 4. FIG. 4 is a diagram for explaining the degree of fluctuations of parameters of an information processing system according to a modified example of the first example embodiment. FIG. 4 shows the degree of fluctuations of parameters A to C calculated for respective GNSS satellites 1 to 3, and a fluctuation index calculated by summing these degrees of fluctuation.

The GNSS satellite 1 will be described in detail as an example. In the GNSS satellite 1, the degree of fluctuation of the parameter A in a preset period is 2. The degree of fluctuation is calculated, for example, by the standard deviation described above. The degree of fluctuation of the parameter B of the GNSS satellite 1 in the preset period is 3. The degree of fluctuation may be calculated by a method different from the method for calculating the parameter A. The degree of fluctuation of the parameter C of the GNSS satellite 1 in the preset period is 1. The fluctuation index obtained by summing the degrees of fluctuation of the parameters of the GNSS satellite 1 is 2+3+1=6. In this example, the smaller the fluctuation index is, the more stable the positioning signal of the GNSS satellite 1 is. Since the fluctuation index is calculated for each GNSS satellite, the fluctuation index may be treated as the satellite accuracy index.

Also in the GNSS satellite 2 and the GNSS satellite 3 in the drawing, the degree of fluctuation of each parameter and the fluctuation index for each GNSS satellite are calculated in a manner similar to those for the GNSS satellite 1. As a result, in this example, the fluctuation index of the GNSS satellite 2 is 7+3+8=18. Likewise, the fluctuation index of the GNSS satellite 3 is 1+1+2=4. The accuracy index calculation unit 103 calculates the fluctuation index of each GNSS satellite in this way. In this example, the fluctuation index of the GNSS satellite 2 is relatively large. Thus, by knowing the fluctuation index, it is found that the reliability of the positioning signal of the GNSS satellite 2 is not high. Although not specifically shown in this example, the calculated fluctuation index may be used to indicate a relative index between the plurality of GNSS satellites, or may be used to indicate whether or not the reliability of the positioning signal of each GNSS satellite is higher than a preset threshold.

Furthermore, the accuracy index calculation unit 103 calculates a value obtained by summing the fluctuation indices as an accuracy index of all of the positioning signals. In the above example, the fluctuation indices of the GNSS satellites 1 to 3 are summed, and the accuracy index is 6+18+4=28. By calculating the accuracy index in this manner, the information processing apparatus 100 provides information for determining the reliability of positioning using the positioning signal from the GNSS satellite. Thus, for example, when the accuracy index is higher than the preset threshold, the user of the information processing apparatus 100 can determine that the reliability of positioning using the positioning signal is high. On the other hand, when the accuracy index is lower than the preset threshold, the user of the information processing apparatus 100 can determine that the reliability of positioning using the positioning signal is low.

With the above configuration, the information processing apparatus 100 according to the modified example of the first example embodiment outputs the accuracy index for determining the reliability of the positioning result using the positioning signal received from the GNSS satellite. Therefore, according to the modified example of the first example embodiment, it is possible to provide an information processing apparatus or the like for determining the reliability of the positioning result using the positioning signal received from the GNSS satellite.

Second Example Embodiment

Figure 5:
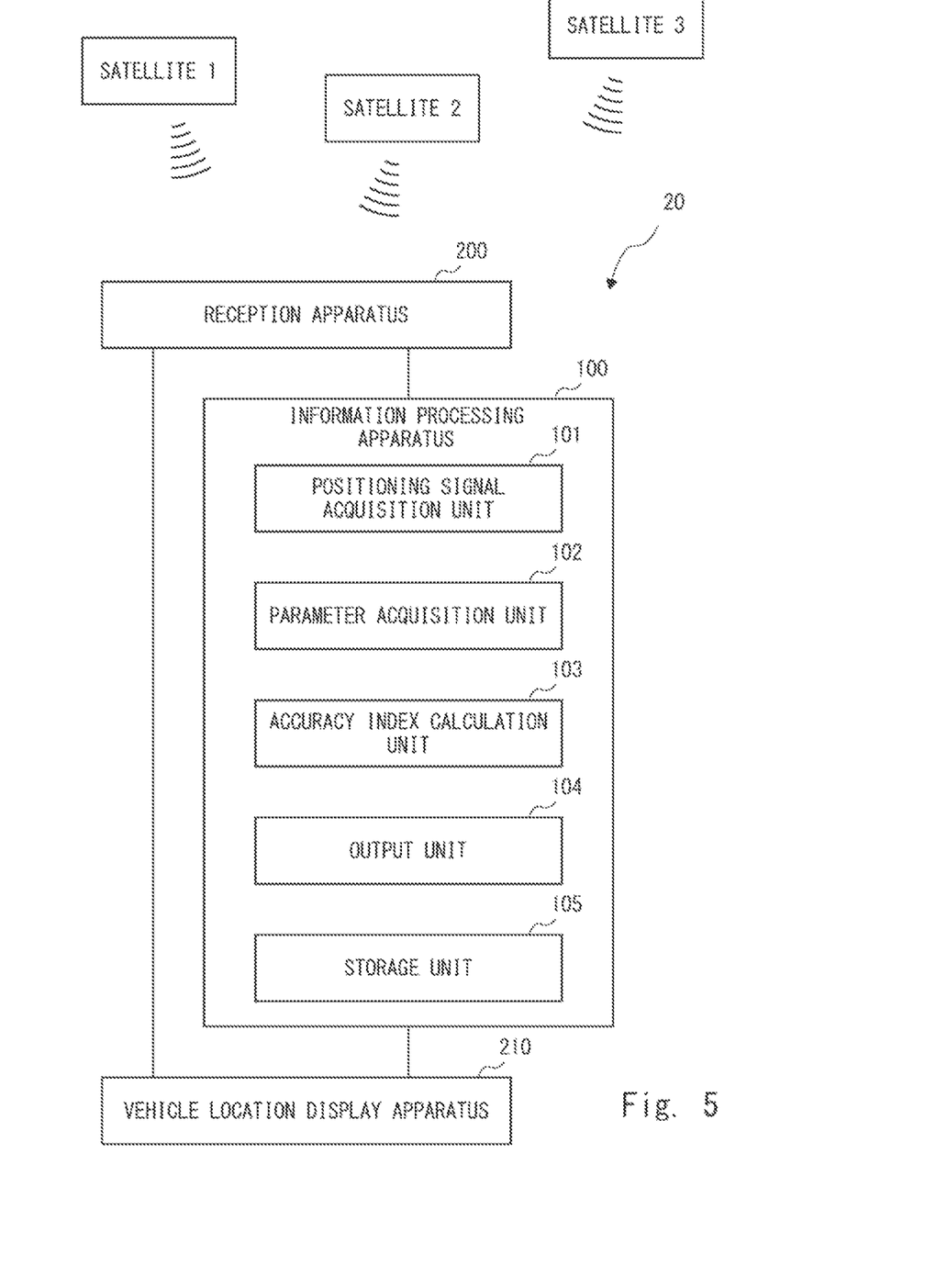
FIG. 5 is a schematic block diagram of an information processing system according to a second example embodiment.

Next, a second example embodiment will be described. The second example embodiment is different from the first example embodiment in that a system according to the second example embodiment includes other components in addition to the components of the above-described information processing apparatus 100. FIG. 5 is a schematic configuration diagram of an information processing system according to the second example embodiment. An information processing system 20 shown in the drawing mainly includes a reception apparatus 200, an information processing apparatus 100, and a vehicle location positioning apparatus 210.

The reception apparatus 200 receives radio waves transmitted from a GNSS satellite and generates a positioning signal from the received radio wave. Then, the reception apparatus 200 supplies the positioning signal to the information processing apparatus 100 and the vehicle location positioning apparatus 210. The reception apparatus includes an antenna for receiving the radio waves from the GNSS satellite and a circuit for amplifying, demodulating, etc., the radio waves received by the antenna. As shown in the drawing, when there are satellites 1 to 3 that transmit the radio waves receivable by the reception apparatus 200, the reception apparatus 200 receives the radio waves from each of the satellites, generates the positioning signals for them, and supplies these signals to the information processing apparatus 100 and the vehicle location positioning apparatus 210.

The vehicle location positioning apparatus 210 receives the positioning signal from the reception apparatus 200 and positions the location of its own vehicle from the received positioning signal. More specifically, the position of the its own vehicle can be calculated from a distance between each GNSS satellite and the vehicle, time information, and the like from the positioning signals of the respective GNSS satellites.

The vehicle location positioning apparatus 210 receives information about the accuracy index and the positioning signal corresponding to the accuracy index from the information processing apparatus 100. Then, the vehicle positioning apparatus 210 refers to the received accuracy index and the like to determine how to handle the positioning signal received from the reception apparatus 200.

In addition, the vehicle location positioning apparatus 210 may include a gyro sensor or the like as means for estimating the location of its own vehicle in addition to the positioning signal received from the reception apparatus 200. By including the gyro sensor or the like, the vehicle location positioning apparatus 210 can estimate the location of its own vehicle when the positioning signal cannot be acquired. Further, the vehicle location positioning apparatus 210 can estimate the location of its own vehicle even when the positioning signal can be acquired. In such a case, the vehicle location positioning apparatus 210 can select between positioning based on the positioning signal from the GNSS satellites and positioning estimated by the gyro sensor or the like to determine the location of its own vehicle.

Figure 6:
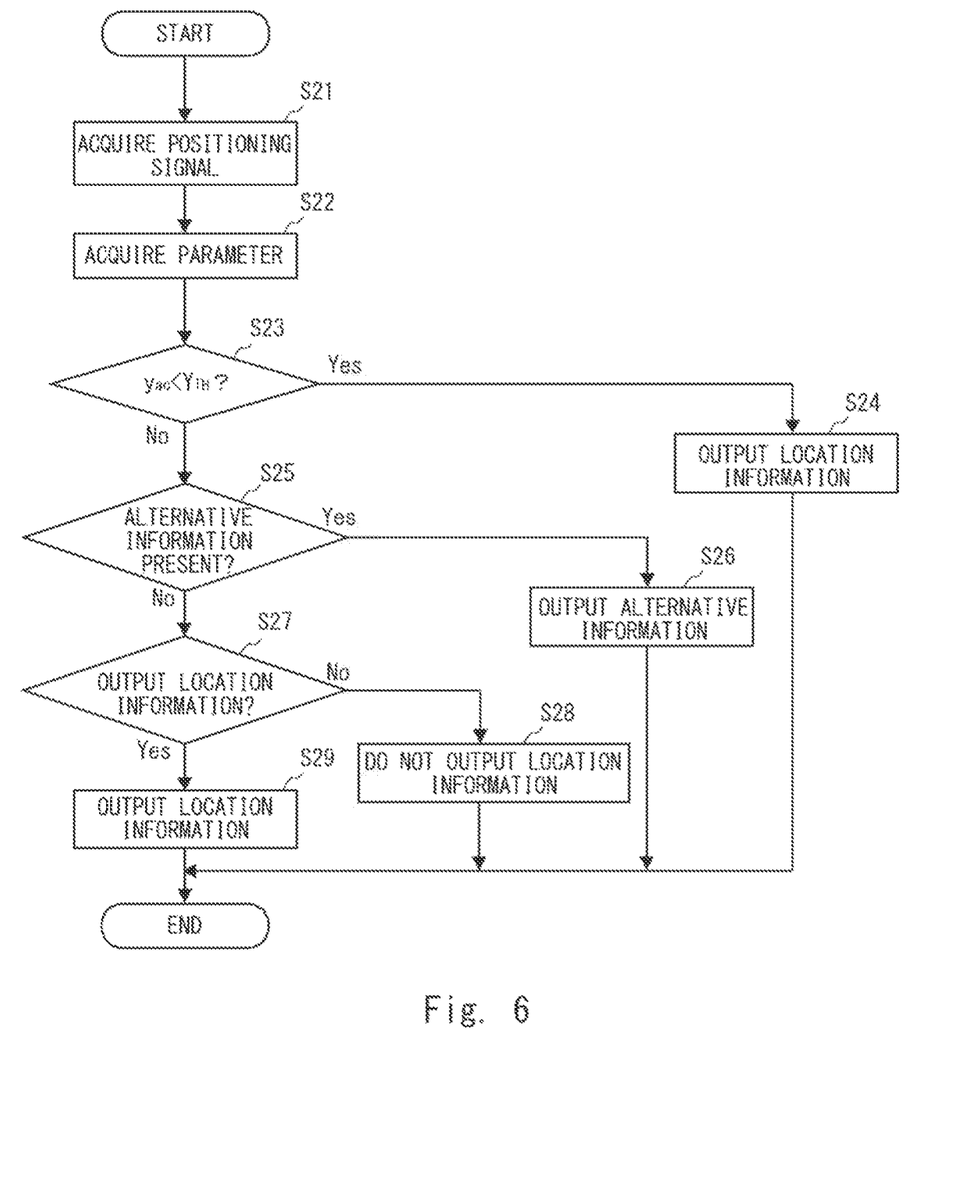
FIG. 6 is a flowchart of processing performed by the information processing apparatus according to the second example embodiment.

Next, an example of the processing of the information processing system 20 will be described with reference to FIG. 6. FIG. 6 is a flowchart of processing performed by the information processing system according to the second example embodiment.

The reception apparatus 200 receives the radio waves from the GNSS satellites and acquires the positioning signals from the received radio waves (Step S21). The reception apparatus 200 supplies the acquired positioning signals to the information processing apparatus 100 and the vehicle location positioning apparatus 210.

Next, the information processing apparatus 100 acquires parameters from the positioning signal received from the reception apparatus 100 by the parameter acquisition unit 102 included in the information processing apparatus 200 (Step S22). The parameter acquisition unit 102 supplies the acquired parameters to the accuracy index calculation unit 103.

Next, the information processing system 20 determines whether or not the positioning signal is degraded (Step S23). Specifically, in Step S23, the accuracy index calculation unit 102 calculates the accuracy index using the parameters received by the parameter acquisition unit 103. Then, as described with reference to FIG. 1, the output unit 104 outputs the accuracy index. The accuracy index output from the output unit 104 is supplied to the vehicle location positioning apparatus 210. The vehicle positioning apparatus 210 determines whether or not the positioning signal related to the received accuracy index is degraded from the value of the accuracy index received from the information processing apparatus 100. To be more specific, the degradation of the positioning signal is determined based on the magnitude of the value of the accuracy index. For example, the vehicle positioning apparatus 210 does not determine that the positioning signal is degraded when an accuracy index $y_{ac}$ is smaller than a threshold $Y_{TH}$ set for the value of the accuracy index, whereas the vehicle positioning apparatus 210 determines that the positioning signal is degraded when the accuracy index $y_{ac}$ is not smaller than the threshold $Y_{TH}$.

If the accuracy index $y_{ac}$ is smaller than the threshold $Y_{TH}$ (Step S23: Yes), the information processing system 20 outputs the location of its own vehicle calculated from the positioning signal as own vehicle location information (Step S24). After the own vehicle location information is output, the information processing system 20 ends the processing.

On the other hand, when the accuracy index $y_{ac}$ is not smaller than the threshold $Y_{TH}$ (Step S23: No), the information processing system 20 does not output the own vehicle location calculated from the positioning signal as the own vehicle location information, and proceeds to Step S25.

Next, the vehicle location positioning apparatus 210 determines whether or not there is alternative information (Step S25). When the means for estimating the location of its own vehicle such as the above-described gyro sensor is included, the vehicle location positioning apparatus 210 determines that the alternative information is present (Step S25: Yes). In this case, the vehicle location positioning apparatus 210 outputs the alternative information (Step S26), and then ends the processing. On the other hand, the means for estimating the location of the vehicle is not included, the vehicle positioning apparatus 210 does not determine that the alternative information is present (Step S25: No), and proceeds to Step S27.

Next, the vehicle location positioning apparatus 210 determines whether or not to output the location information calculated from the positioning signal (Step S27). If the vehicle location positioning apparatus 210 does not determine that the location information calculated from the degraded positioning signal is to be output (Step S27: No), the information processing system 20 does not output the location information (Step S28), and ends the processing. On the other hand, when the vehicle location positioning apparatus 210 determines that the location information calculated from the degraded positioning signal is to be output (Step S27: Yes), the information processing system 20 outputs the location information (Step S29). After outputting the location information, the information processing system 20 ends the processing.

The information processing system 20 according to the second example embodiment has been described so far. According to the second example embodiment, it is possible to determine the reliability of the positioning result using the positioning signal received from the GNSS satellite, and to determine whether or not to output the location information calculated from the acquired positioning signal according to the determined result. When the alternative information is present, the alternative information can be output when the accuracy of the positioning signal is not high. With this configuration, the information processing system 20 according to the second example embodiment can output the own vehicle location information with higher reliability.

Note that the present disclosure is not limited to the above-described example embodiments, and may be modified as appropriate without departing from the spirit of the disclosure.

In the above example embodiments, the present disclosure has been described as a hardware configuration, but the present disclosure is not limited to this. The present disclosure can also be realized by causing a CPU (Central Processing Unit) to execute a computer program for specified processing (e.g., the processing of the flowchart of FIG. 2 or 6). The above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application is based upon and claims the benefit of priority from Japanese patent application No. 2018-180824, filed on Sep. 26, 2018, the disclosure of which is incorporated herein in its entirety by reference.

REFERENCE SIGNS LIST

20 INFORMATION PROCESSING SYSTEM
100 INFORMATION PROCESSING APPARATUS
101 POSITIONING SIGNAL ACQUISITION UNIT
102 PARAMETER ACQUISITION UNIT
103 ACCURACY INDEX CALCULATION UNIT
104 OUTPUT UNIT
105 STORAGE UNIT
200 RECEPTION APPARATUS
210 VEHICLE LOCATION POSITIONING APPARATUS
P3 SAMPLING PERIOD
P4 BUFFERING PERIOD

What is claimed is:

1. An information processing apparatus comprising:
a positioning signal acquisition unit configured to acquire a positioning signal transmitted from a positioning satellite;
a parameter acquisition unit configured to acquire a parameter preset based on the positioning signal;
a storage unit configured to store a plurality of the parameters at a plurality of time points in a preset period;
an accuracy index calculation unit configured to calculate a positioning accuracy index from the plurality of stored parameters; and
an output unit configured to output the positioning accuracy index, wherein
the accuracy index calculation unit calculates a degree of fluctuation according to a fluctuation of the parameter in the period for each parameter and calculates the positioning accuracy index based on the degree of fluctuation,
the accuracy index calculation unit further calculates a satellite accuracy index based on the degree of fluctuation for each positioning satellite, and
the output unit outputs the satellite accuracy index together with the positioning accuracy index.

2. The information processing apparatus according to claim 1, wherein
the parameter acquisition unit acquires at least one of a value of a geometric distance, a clock error, an ionospheric delay, a tropospheric delay, a carrier phase bias, and a radio wave intensity as the parameter.

3. The information processing apparatus according to claim 1, wherein
the accuracy index calculation unit calculates the positioning accuracy index based on the period changing according to a traveling speed of a positioning object.

4. The information processing apparatus according to claim 3, wherein
the period used by the accuracy index calculation unit for calculating the positioning accuracy index is set in such a way that a first period at a first speed becomes shorter than a second period at a second speed that is faster than the first speed.

5. An information processing system comprising:
the information processing apparatus according to claim 1; and
a reception apparatus configured to receive the positioning signal.

6. An information processing method comprising:
acquiring a positioning signal transmitted from a positioning satellite;
acquiring a parameter preset based on the positioning signal;
storing a plurality of the parameters at a plurality of time points in a preset period;
calculating a positioning accuracy index from the plurality of stored parameters; and
outputting the positioning accuracy index, wherein the processing method further comprises:
calculating a degree of fluctuation according to a fluctuation of the parameter in the period for each parameter and the positioning accuracy index based on the degree of fluctuation,
calculating a satellite accuracy index based on the degree of fluctuation for each positioning satellite, and
outputting the satellite accuracy index together with the positioning accuracy index.

7. A non-transitory computer readable medium storing a program causing a computer to execute an information processing method comprising:
acquiring a positioning signal transmitted from a positioning satellite;

acquiring a parameter preset based on the positioning signal;

storing a plurality of the parameters at a plurality of time points in a preset period;

calculating a positioning accuracy index from the plurality of stored parameters; and outputting the positioning accuracy index, wherein the processing method further comprises:

calculating a degree of fluctuation according to a fluctuation of the parameter in the period for each parameter and the positioning accuracy index based on the degree of fluctuation, calculating a satellite accuracy index based on the degree of fluctuation for each positioning satellite, and outputting the satellite accuracy index together with the positioning accuracy index.

* * * * *